United States Patent [19]

Tirpak et al.

[11] Patent Number: 5,185,200
[45] Date of Patent: Feb. 9, 1993

[54] AQUEOUS POLYISOCYANATE DISPERSIONS WITH REDUCED ISOCYANATE CONTENTS AND THEIR USE FOR THE PRODUCTION OF FIBERGLASS MATS

[75] Inventors: Robin E. Tirpak, Wheeling, W. Va.; Peter H. Markusch, McMurray, Pa.; Ashok M. Sarpeshkar, New Martinsville, W. Va.

[73] Assignee: Miles Inc., Pittsburgh, Pa.

[21] Appl. No.: 676,670

[22] Filed: Mar. 28, 1991

[51] Int. Cl.$^5$ .............. C03C 25/02; C08G 18/08; C08G 18/32; C08L 75/02; C08L 75/04

[52] U.S. Cl. .............. 428/288; 65/3.43; 427/389.8; 428/290; 428/378; 524/591; 524/839; 524/874; 528/44; 528/49; 528/60; 528/61

[58] Field of Search .............. 524/839, 591, 874; 528/49, 44, 60, 61; 65/3.43; 427/389.8; 428/288, 290, 378

[56] References Cited

U.S. PATENT DOCUMENTS

| | | | |
|---|---|---|---|
| 3,905,929 | 9/1975 | Noll | 528/49 |
| 4,011,311 | 3/1977 | Noomen et al. | 524/839 |
| 4,203,883 | 5/1980 | Hangauer | 528/44 |
| 4,745,151 | 5/1988 | Noll et al. | 524/591 |
| 4,808,008 | 10/1989 | Markusch | 524/591 |
| 4,904,522 | 2/1990 | Markusch | 428/288 |

FOREIGN PATENT DOCUMENTS

| | | |
|---|---|---|
| 458153 | 11/1991 | European Pat. Off. . |
| 1362674 | 8/1974 | United Kingdom . |

Primary Examiner—James C. Cannon
Attorney, Agent, or Firm—Joseph C. Gil; Thomas W. Roy

[57] ABSTRACT

The present invention is directed to an aqueous polyisocyanate dispersion which has an isocyanate content of at least 0.5% by weight, based on the weight of the polyisocyanate, and is prepared by a) dispersing in water a polyisocyanate which has an isocyanate content of at least 12% by weight and
b) reacting the dispersed polyisocyanate with
i) a primary or secondary monoamine containing at least one hydroxyl group in an amount sufficient to provide an equivalent ratio of amino groups to isocyanate groups of 0.1:1.0 to 0.7:1.0 and
ii) a polyamine having primary and/or secondary amino groups and a molecular weight of 400 or less in an amount sufficient to provide an equivalent ratio of amino groups to isocyanate groups of 0.1:1.0 to 0.4:1.0, wherein component i) is mixed with the dispersed polyisocyanate either before or during the mixing of component ii) and provided that the equivalent ratio of amino groups from both components i) and ii) does not exceed 0.95:1.0.

The present invention is also directed to a process for the preparation of a fibrous mat by treating fibers with the dispersed polyisocyanate before the isocyanate content of the dispersed polyisocyanate is less than 0.5% by weight, based on the weight of the polyisocyanate. Finally, the present invention is directed to the fibrous mats obtained in accordance with this process.

25 Claims, No Drawings

AQUEOUS POLYISOCYANATE DISPERSIONS WITH REDUCED ISOCYANATE CONTENTS AND THEIR USE FOR THE PRODUCTION OF FIBERGLASS MATS

BACKGROUND OF THE INVENTION

1. Field of the Invention

The present invention is directed to improved aqueous polyisocyanate dispersions having a reduced isocyanate content and to their use as binders for fibers, especially fiberglass.

2. Description of the Prior Art

It is known from U.S. Pat. No. 4,904,522 to use aqueous dispersions of polyisocyanates as binders for fiberglass. When compared to known phenol/formaldehyde resins, the polyisocyanate binders cure at a much lower temperature, do not split off volatile monomers, provide at least the same strength, are not a potential formaldehyde source and do not require an amino alkoxy silane adhesion promoter. However, the polyisocyanate binders disclosed in the copending application have relatively high quantities of unmodified monomeric diisocyanates. Because the presence of monomeric diisocyanates may lead to industrial hygiene problems, it would be beneficial to reduce the content of monomeric diisocyanates as much as possible.

Another deficiency of the polyisocyanate binders disclosed in U.S. Pat. No. 4,904,522 is that it is difficult to achieve complete cure during subsequent heating of the fiberglass mats in the oven zone. During the production of fiberglass mats, the fibers are treated with the aqueous polyisocyanate binders and continuously run through an oven zone in order to evaporate water and to cure the polyisocyanate resins.

When aqueously dispersed polyisocyanates are used as binders, the water serves as the co-reactant for the isocyanate groups to form polyureas. If the isocyanate content of the polyisocyanate binder is too high, water is evaporated in the oven zone before the reaction is complete and as a result, an uncured, unusable fiberglass mat is obtained.

A further disadvantage is that even though the preferred polyisocyanates of U.S. Pat. No. 4,904,522, i.e., polyphenyl polymethylene polyisocyanates, exhibit a low vapor pressure at ambient temperature, they still contain high amounts (as much as 70% by weight) of monomeric diphenyl methane diisocyanates. Upon exposure to the high temperatures in the oven zone these monomeric diisocyanates can be volatilized which results in high concentrations in the exhaust gases. This represents an environmental hazard if these exhaust gases escape into the atmosphere of the workplace or the air surrounding the manufacturing facility.

One method for lowering the isocyanate content of the polyisocyanate binders would be to react the polyisocyanates with polyols to form isocyanate-terminated prepolymers prior to dispersing in water. However, this results in products which have high viscosities at the desired low isocyanate content, i.e., an isocyanate content of less than 10% by weight, based on solids, and thus are too viscous to disperse in water even if they have been hydrophilically modified. Another method of avoiding uncured polyisocyanate binders is to incorporate catalysts which promote the isocyanate/water reaction in the aqueously dispersed polyisocyanate binders. However, this method also does not result in a complete cure of the polyisocyanate prior to evaporation of water in the oven zone.

One method of reducing the isocyanate content of the aqueous polyisocyanate binders is disclosed in copending application, U.S. Ser. No. 07/529,056, filed May 25, 1990. In accordance with this application the aqueous polyisocyanate binders are reacted with primary or secondary monoamines containing at least one hydroxyl group in an amount sufficient to provide an equivalent ratio of amino groups to isocyanate groups of 0.6:1.0 to 0.95:1.0. The disadvantage of this process is that the reaction of even 20 to 30% of the isocyanate groups of aqueous polyisocyanate binders having a solids content of 10% by weight with the amino groups from ethanolamine results in dispersions which become so viscous and structured that they no longer flow like liquids and cannot be readily reliquified.

A second method of reducing the isocyanate content of aqueous polyisoycanate binders and increasing their storage stability is disclosed in copending application, Ser. No. 677,011. In accordance with this application the aqueous polyisoycanate binders are reacted with low molecular weight polyamines in order to encapsulate the polyisocyanate and render it less reactive with water. While the process disclosed in this application is effective for increasing the storage stability, it is only possible to react about 30 to 40% of the isocyanate groups of the polyisocyanate. The remainder of the isocyanate groups are present in the interior of the dispersed polyisocyanate particles and do not react with the polyamine.

Accordingly, it is an object of the present invention to provide aqueously dispersed polyisocyanate binders which have reduced isocyanate contents and do not possess any of the deficiencies of the previously described binders. It is an additional object to provide aqueously dispersed polyisocyanate binders which need only small amounts of water to cure and which develop their final properties much more rapidly under the given conditions. It is a further object of the present invention to provide aqueously dispersed polyisocyanates that despite their low isocyanate contents still exhibit film forming properties and excellent adhesion to the fibers. Finally, it is an object of the present invention to provide aqueously dispersed polyisocyanate binders which have the advantage of containing only small amounts of volatile monomeric diisocyanates.

These objects may be achieved in accordance with the present invention as described hereinafter.

SUMMARY OF THE INVENTION

The present invention is directed to an aqueous polyisocyanate dispersion which has an isocyanate content of at least 0.5% by weight, based on the weight of the polyisocyanate, and is prepared by a) dispersing in water a polyisocyanate which has an isocyanate content of at least 12% by weight and b) reacting the dispersed polyisocyanate with i) a primary or secondary monoamine containing at least one hydroxyl group in an amount sufficient to provide an equivalent ratio of amino groups to isocyanate groups of 0.1:1.0 to 0.7:1.0 and ii) a polyamine having primary and/or secondary amino groups and a molecular weight of 400 or less in an amount sufficient to provide an equivalent ratio of amino groups to isocyanate groups of 0.1:1.0 to 0.4:1.0, wherein component i) is mixed with the dispersed polyisocyanate either before or during the mixing of component ii) and provided that the equivalent ratio of amino groups from both components i) and ii) does not exceed 0.95:1.0.

The present invention is also directed to a process for the preparation of a fibrous mat by
a) dispersing in water a polyisocyanate which has an isocyanate content of at least 12% by weight,
b) reacting the dispersed polyisocyanate with
  i) a primary or secondary monoamine containing at least one hydroxyl group in an amount sufficient to provide an equivalent ratio of amino groups to isocyanate groups of 0.1:1.0 to 0.7:1.0 and
  ii) a polyamine having primary and/or secondary amino groups and a molecular weight of 400 or less in an amount sufficient to provide an equivalent ratio of amino groups to isocyanate groups of 0.1:1.0 to 0.4:1.0,
 wherein component i) is react either before or during the reaction of component ii) and provided that the equivalent ratio of amino groups from both components i) and ii) does not exceed 0.95:1.0 and
c) subsequently treating fibers with the dispersed polyisocyanate before the isocyanate content of the dispersed polyisocyanate is less than 0.5% by weight, based on the weight of the polyisocyanate.

Finally, the present invention is also directed to the fibrous mats obtained in accordance with this process.

DETAILED DESCRIPTION OF THE INVENTION

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water even if they are hydrophilically modified.

Examples of suitable monomeric polyisocyanates include 1,6-hexamethylene diisocyanate, 1,12-dodecane diisocyanate, cyclobutane-1,3-diisocyanate, cyclohexane-1,3-and/or -1,4-diisocyanate, 1-isocyanato-3,3,5-trimethy cyclohexane, 2,4-and/or 2,6-hexahydrotoluylene diisocyanate, hexahydro-1,3- and/or -1,4-phenylene diisocyanate, perhydro-2,4'- and/or -4,4'-diphenylmethane diisocyanate, 1,3-and/or 1,4-phenylene diisocyanate, 2,4-and/or 2,6-toluylene diisocyanate, diphenylmethane-2,4'- and/or-4,4'-diisocyanate, napthalene-1,5-diisocyanate, triphenylmethane-4,4', 4"-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, urethane groups or biuret groups, especially those based on 2,4- and/or 2,6-toluylene diisocyanate ("TDI").

The polyisocyanates or polyisocyanate adducts used to prepare the aqueous dispersions of the present invention may be used in their unmodified, hydrophobic form or they may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formulae

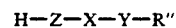

or

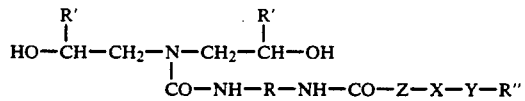

wherein
R represents a difunctional radical obtained by removing the isocyanate groups from a diisocyanate corresponding to those previously set forth,
R' represents hydrogen or a monovalent hydrocarbon radical containing from 1 to 8 carbon atoms, preferably hydrogen or a methyl group,
R" represents a monovalent hydrocarbon radical having from 1 to 12 carbon atoms, preferably an unsubstituted alkyl radical having from 1 to 4 carbon atoms,
X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units, Y represents oxygen or -NR'''- wherein R''' has the same definition as R'' and Z represents a radical which corresponds to Y, but may additionally represent -NH-.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosures of which are herein incorporated by reference.

In addition to the previously discussed hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers, for example, those disclosed in British Patents 1,414,930, 1,432,112 and 1,428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water preferably have a functionality of at least 2, more preferably at least 2.2. These compounds may be prepared by reacting polyisocyanates having functionalities of greater than 2 with a monofunctional compound containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred since this reduces the functionality to less than 2. Accordingly, the functionality of the component containing hydrophilic groups and the functionality of the polyisocyanate must be taken into consideration in order to ensure that the modified polyisocyanates have functionalities of at least 2.

The polyisocyanate dispersions generally have a solids content of about 2 to 50, preferably about 10 to 30 weight percent.

After the polyisocyanates have been dispersed in water, they are reacted primary or secondary monoamines containing one or two hydroxy groups and with the polyamines having primary and/or secondary amino groups. Suitable monoamines include those which correspond to the formula

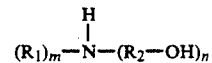

wherein $R_1$ represents hydrogen or an alkyl, cycloalkyl, araliphatic or aromatic group having up to 15 carbon atoms, preferably an alkyl group containing 1 to 6 carbon atoms, $R_2$ is an optionally branched alkylene group containing 1 to 12, preferably 1 to 4 carbon atoms, m represents 0 or 1, n represents 1 or 2 and $m+n=2$.

Examples of suitable monoamines include ethanolamine, propanolamine, butanolamine, N-methyl-ethanolamine, N-ethyl-ethanolamine, N-propyl-ethanolamine, N-butyl-ethanolamine, N-methyl-propanolamine, N-ethyl-propanolamine, N-propyl-propanolamine, N-butyl-propanolamine, N-methyl-butanolamine, N-ethyl-butanolamine, N-propyl-butanolamine, N-butyl-butanolamine, diethanolamine, dipropanolamine, dibutanolamine, and N-ethanol-N-propanolamine. Ethanolamine is especially preferred.

Suitable polyamines for reacting with the aqueously dispersed polyisocyanates are those having a molecular weight of less than about 400 and containing two or more primary and/or secondary amino groups. The amino groups may aliphatically-, cycloaliphatically-, araliphatically- or aromatically-bound. Examples of suitable polyamines include ethylene diamine, 1,3-propane diamine, 1,4-butane diamine, 2-methyl-pentamethylene diamine, N,N'-dimethyl-ethylene diamine, diethylene triamine, triethylene tetraamine, tetraethylene pentamine, pentaethylene hexamine, 1,6-hexane diamine, piperazine, 2,5-dimethyl piperazine, 1-amino-3-aminomethyl-3,5,5-trimethylcyclohexane (isophorone diamine), bis-(4-aminocyclohexyl)-methane, bis-(4-amino-3-methylcyclcohexyl)-methane, 1,2 and 1,4-cyclohexane diamine, 1,2-propanediamine, hydrazine, aminoacid hydrazides, hydrazides of semicarbazido carboxylic acids, bis-hydrazides, bis-semicarbazides, N,N,N-tris-(2-aminoethyl)-amine, N-(2-piperazinoethyl) ethylene diamine, N,N'-bis-(2-aminoethyl)-piperazine, N,N,N'-tris-(2-aminoethyl)-ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4, triaminopyrimidine, polyoxypropylene amines, tetrapropylene pentamine, tripropylene tetramine, N,N-bis-(6-aminohexyl)-amine, N,N'-bis-(3-aminopropyl)-ethylene diamine, 2,4-bis-(4'-aminobenzyl)-aniline, diethyl-toluene diamine isomers, toluene diamine isomers, 1,3-phenylene diamine, methylene-bis-(phenylamine) isomers, 1,5-naphthalene diamine, aniline, alkyl anilines, toluidine, t-butyl-toluene diamine isomers, methylene-bis-(o-dichloroaniline) (MOCA), 2,4-diaminoalkyl-benzene isomers having 8 to 15 carbon atoms in the alkyl chain and mixtures of these polyamines.

Preferred polyamines include ethylene diamine, 1,3-propane diamine, 1,4-butane diamine, 2-methyl-pentamethylene diamine, N,N'-dimethyl-ethylene diamine, diethylene triamine, piperazine, 1-amino-3-aminomethyl-3,5,5-trimethylcyclohexane (isophorone diamine), bis-(4-aminocyclohexyl)-methane, 1,2-propane diamine, hydrazine, diethyl-toluene diamine isomers, 1,3-phenylene diamine and mixtures thereof.

The monoamine or polyamine may be added to the water either before, during or after the polyisocyanate has been dispersed. Preferably, the polyisocyanate is first dispersed in water and then the monoamine and polyamine are added to the dispersed polyisocyanate. The monoamine may be added prior to the polyamine or they may added at the same time, preferably in admixture. It is not recommended to add the polyamine before the monoamine because the polyamine will encapsulate the polyisocyanate making further reaction with the monoamine difficult because the monoamine will have to migrate to the inside of the encapsulated, dispersed polyisocyanate particle. If the polyamine is added in an amount that is less than the amount required to encapsulate all of the dispersed polyisocyanate particles, it is possible to add the polyamine before the monoamine; however, this is not recommended.

The amount of the monoamine containing at least one hydroxyl group is chosen to provide an equivalent ratio of amino groups to isocyanate groups of the polyisocyanate of 0.1:1.0 to 0.7:1.0, preferably 0.2:1.0 to 0.6:1.0. The amount of polyamine is chosen to provide an equivalent ratio of amino groups to isocyanate groups of 0.1:1.0 to 0.4:1.0, preferably 0.15:1.0 to 0.35:1.0. The amounts of monoamine and polyamine are also chosen to ensure that the equivalent ratio of the total amount of amino groups to isocyanate groups does not exceed 0.95:1.0.

In accordance with the present invention it is possible to obtain a dispersed, modified polyisocyanate which has a low free isocyanate content and which does not form a viscous mass which is no longer flowable and which cannot be reliquified. In accordance with the present invention the aqueous dispersion of the modified polyisocyanate is obtained in the form of a liquid or in the form of a non-flowable solid which can be reliquified with mild agitation.

The maximum amount of the monoamine and polyamine which may be reacted with the dispersed polyisocyanate in accordance with the present invention depends upon the solids content of the polyisocyanate dispersion. At a solids content of 10% by weight a maximum amount of 35% of the isocyanate groups may be reacted with the amino groups of the monoamine and a maximum of 25% of the isocyanate groups may be reacted with the polyamine to produce the modified polyisocyanate. At a solids content of 5% by weight a maximum amount of 50% of the isocyanate groups may be reacted with the amino groups of the monoamine and a maximum of 30% of the isocyanate groups may be reacted with the polyamine to produce the modified polyisocyanate.

When the polyisocyanate dispersion has an even lower solids content, the maximum percentage of the isocyanate groups which can be reacted can be further increased, provided that a sufficient percentage of the isocyanate groups react with the polyamine to ensure that the modified polyisocyanate is in the form of a liquid or in the form of a non-flowable solid which can be reliquified.

The amount of the polyamine which is necessary to ensure that the modified polyisocyanate is either liquid or a non-flowable solid which can be reliquified is dependent upon the solids content of the polyisocyanate dispersion and upon the particular polyamine which is reacted with the polyisocyanate. For example, more ethylene diamine can be reacted with the polyisocyanate before it is encapsulated than 2-methyl-pentamethylene diamine.

In accordance with the present invention it is important to ensure that a sufficient percentage of the isocyanate groups are reacted with the amino groups of the monoamine and polyamine. Otherwise, all of the unreacted isocyanate groups may not cure prior to vaporization of the water in the oven zone as previously discussed.

It is also important not to react all of the isocyanate groups prior to applying the low NCO content polyisocyanate dispersions to the fibers. If all of the isocyanate groups have been reacted prior to this step, then the polyisocyanate is no longer film forming and will not adequately bind the fibers. Accordingly, prior to spraying the polyisocyanate dispersion onto the fibers, the NCO content should be at least 0.5%, preferably at least 1.0% by weight, based on the weight of the modified polyisocyanate.

Accordingly, if the polyisocyanate dispersion is to be applied to the fibers immediately after the addition of the monoamine and polyamine, i.e., within 10 to 20 minutes, then the upper limit of chain extender to be added is an amount sufficient to provide an equivalent ratio of amino groups to isocyanate groups of about 0.95:1.0. This is because the hydroxyl groups of the monoamine will not have sufficient time to react with the isocyanate groups before the dispersed polyisocyanate is applied to the fibers, thus ensuring a sufficient NCO content to provide a film-forming polyisocyanate. To the contrary, if it will be more than 20 minutes after the addition of the chain extender before the polyisocyanate dispersion is to be applied to the fibers, then lesser amounts of the chain extender should be used so that the isocyanate content will be at least 0.5% by weight as previously discussed. While, it is preferred to apply the dispersed polyisocyanate to the fibers within 10 to 20 minutes after the addition of the chain extender, this is not always possible. However, in accordance with the present invention it is possible to extend this time period from a few hours to several days.

Suitable fibers for use in accordance with the present invention include fiberglass, wood fibers, carbon fibers and synthetic organic fibers such as polyamide fibers. Fiberglass is especially preferred.

In a preferred embodiment of the present invention fiberglass mats are prepared by spraying the fibers with the aqueous polyisocyanates, which are generally applied to the glass directly below the spinner in which very hot liquid glass is converted into fibers. The aqueous polyisocyanate is then cured by passing through an oven in known manner.

The polyisocyanate dispersion having a low NCO content obtained after the reaction with the monoamine containing at least one hydroxyl group and polyamine is generally applied to the the fibers at a viscosity of about 5 to 5000, preferably 20 to 1000 mPa.s. Since the low NCO content polyisocyanate dispersions are preferably applied to the fibers by spraying, it is essential to maintain the viscosity in a range which is suitable for spraying. The polyisocyanate emulsions are applied to the fibers in an amount sufficient to provide about 1 to 20, preferably 2 to 10 weight percent of polyisocyanate solids, based on the weight of the fibers.

In accordance with the present invention, it is also possible to incorporate additives into the polyisocyanate emulsions. The additives may be present in the form of a solution or in the form of an emulsion or dispersion. These additives are known and include catalysts such as tertiary amines, aminosilanes having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The invention is further illustrated but is not intended to be limited by the following examples in which all parts and percentages are by weight unless otherwise specified.

EXAMPLES

Example 1

Preparation of Modified Polyisocyanate

A three liter round bottom flask equipped with a thermometer, drying tube, condenser, and stirrer was charged with 1366 grams of Crude MDI[1] and 683 grams of a monofunctional poly(ethylene oxide) ether[2]. The temperature of the reaction flask was increased to 80° C. The reaction proceeded at this temperature for four hours at which time the isocyanate content was determined by titration to be 20.48% (theoretical NCO=20.68%). The prepolymer was cooled to ambient temperature and placed in dry bottles for later use.

[1] An aniline/formaldehyde condensation product containing 4,4'-diphenylmethane diisocyanate and about 50% of higher functionality homologs and having an isocyanate content of about 31.5% and a viscosity at 25° C. of 200 mPa.s.
[2] A polyether monohydric alcohol having a molecular weight of 2200 and prepared from n-butanol, ethylene oxide and propylene oxide (molar ratio of ethylene oxide to propylene oxide—83:17).

Example 2

Preparation of Aqueous Polyisocyanate Dispersion (Comparison)

A two liter resin flask was charged with 465 grams of demineralized water at ambient temperature. While rapidly stirring the water, 50 grams of the modified polyisocyanate of Example 1 were added over a period of several minutes to the flask. An ethanolamine solution (4.39 grams in 25 grams of water) was added in one portion, immediately following the dispersing step. This corresponded to a reaction of 30% of the isocyanate groups with amino groups. The off-white dispersion, which had a solids content of 10%, was stirred for 15 minutes at which time the viscosity was 530 mPa.s @ 25° C. After standing an additional 15 minutes the viscosity was 8300 mPa.s @ 25° C. After standing a total of 40 minutes the dispersion was a non-flowing solid which could not be easily returned to the liquid state. The pH of the dispersion was 6.3.

Example 3

Preparation of Aqueous Polyisocyanate Dispersion (Comparison)

A two liter resin flask was charged with 492 grams of demineralized water at ambient temperature. While rapidly stirring the water, 25 grams of the modified polyisocyanate of Example 1 were added in about two minutes to the flask. An aqueous ethylene diamine (EDA) solution (1.3 grams EDA in 7 grams of water) was added, in one portion, immediately following the dispersing step. This corresponded to a reaction of 35% of the isocyanate groups with amino groups. The off-white dispersion, which had a solids content of 5%, was stirred for 15 minutes at which time the viscosity was 10 mPa.s @ 25° C. The pH of the dispersion was 9.8. The high pH indicates that unreacted amine remained in the water and that encapsulation of the modified polyisocyanate had taken place.

Example 4

Preparation of Aqueous Polyisocyanate Dispersion

A two liter resin flask was charged with 468 grams of demineralized water at ambient temperature. While rapidly stirring the water, 50 grams of the modified polyisocyanate of Example 1 were added in about two minutes to the flask. An aqueous ethylenediamine/ethanolamine solution (1.8 grams EDA and 3.65 grams ethanolamine in 31 grams of water) was added, in one portion, immediately following the dispersing step. This corresponded to a reaction of 50% of the isocyanate groups with amino groups (i.e., 25% with the amino groups of ethanolamine and 25% with ethylene diamine). The off-white dispersion, which had a solids content of 10%, was stirred for 15 minutes at which time the viscosity was 10 mPa.s @ 25° C. The pH of the dispersion was 7.6. After standing an additional 15 minutes the viscosity was 15 mPa.s @ 25° C. and the pH was 6.9. After approximately 42 hours the viscosity was 50 mPa.s @ 25° C.

Example 5

Preparation of Aqueous Polyisocyanate Dispersion

A two liter resin flask was charged with 514 grams of demineralized water at ambient temperature. While rapidly stirring the water, 25 grams of the modified polyisocyanate of Example 1 were added in about two minutes to the flask. An aqueous ethylenediamine/ethanolamine solution (0.7 grams EDA and 2.19 grams ethanolamine in 16 grams of water) was added, in one portion, immediately following the dispersing step. This corresponded to a reaction of 50% of the isocyanate groups with amino groups (i.e., 30% with the amino groups of ethanolamine and 20% with ethylene diamine). The off-white dispersion, which had a solids content of 5%, was stirred for 15 minutes at which time the viscosity was 10 mPa.s @ 25° C. The pH of the dispersion was 7.8. After standing an additional 60 minutes the viscosity was 25 mPa.s @ 25° C. After approximately 48 hours the viscosity was 130 mPa.s @ 25° C.

Example 6

Preparation of Aqueous Polyisocyanate Dispersion

A two liter resin flask was charged with 524 grams of demineralized water at ambient temperature. While rapidly stirring the water, 25 grams of the modified polyisocyanate of Example 1 were added in about two minutes to the flask. An aqueous ethylenediamine/ethanolamine solution (0.7 grams EDA and 2.93 grams ethanolamine in 21 grams of water) was added, in one portion, immediately following the dispersing step. This corresponded to a reaction of 60% of the isocyanate with amine (i.e., 40% with the amino groups of ethanolamine and 20% with ethylene diamine). The off-white dispersion, which had a solids content of 5%, was stirred for 15 minutes at which time the viscosity was 500 mPa.s @ 25° C. The pH of the dispersion was 7.4. After standing an additional 30 minutes the dispersion took on the consistency of gelatin. After an additional two hours the dispersion was agitated by hand. This transformed the dispersion to a liquid having a viscosity of 1500 mPa.s @ 25° C. After approximately 24 hours the solidified dispersion was again agitated by hand returning it to a liquid with the viscosity of 3400 mPa.s @ 25° C.

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. An aqueous polyisocyanate dispersion which has an isocyanate content of at least 0.5% by weight, based on the weight of the polyisocyanate, and is prepared by a process which comprises
   a) dispersing in water a polyisocyanate which has an isocyanate content of at least 12% by weight and
   b) reacting the dispersed polyisocyanate with
      i) a primary or secondary monoamine containing at least one hydroxyl group in an amount sufficient to provide an equivalent ratio of amino groups to isocyanate groups of 0.1:1.0 to 0.7:1.0 and
      ii) a polyamine having primary and/or secondary amino groups and a molecular weight of 400 or less in an amount sufficient to provide an equivalent ratio of amino groups to isocyanate groups of 0.1:1.0 to 0.4:1.0,
   wherein component i) is mixed with the dispersed polyisocyanate either before or during the mixing of component ii) and provided that the equivalent ratio of amino groups from both components i) and ii) to isocyanate groups does not exceed 0.95:1.0.

2. The aqueous polyisocyanate dispersion of claim 1 wherein said dispersed polyisocyanate is rendered hydrophilic by reaction with a compound containing a lateral or terminal nonionic hydrophilic group.

3. The aqueous polyisocyanate dispersion of claim 1 wherein said primary or secondary monoamine corresponds to the formula

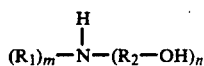

wherein $R_1$ represents hydrogen or an alkyl, cycloalkyl, araliphatic or aromatic group having up to 15 carbon atoms, $R_2$ is an optionally branched alkylene group containing 1 to 12 carbon atoms, m represents 0 or 1, n represents 1 or 2 and m+n=2.

4. The aqueous polyisocyanate dispersion of claim 3 wherein $R_1$ is an alkyl group containing 1 to 6 carbon atoms and $R_2$ is an optionally branched alkylene group containing 1 to 4 carbon atoms.

5. An aqueous polyisocyanate dispersion which has a functionality of at least 2 and an isocyanate content of at least 0.5% by weight, based on the weight of the polyisocyanate, and is prepared by a process which comprises
   a) dispersing in water an aromatic polyisocyanate which has an isocyanate content of at least 12% by weight and is rendered hydrophilic by reaction with a compound containing a lateral or terminal nonionic hydrophilic group and
   b) reacting the dispersed polyisocyanate with
      i) a primary or secondary monoamine containing at least one hydroxyl group in an amount sufficient to provide an equivalent ratio of amino groups to isocyanate groups of 0.1:1.0 to 0.7:1.0 and
      ii) a polyamine having primary and/or secondary amino groups and a molecular weight of 400 or less in an amount sufficient to provide an equivalent ratio of amino groups to isocyanate groups of 0.1:1.0 to 0.4:1.0,
   wherein component i) is mixed with the dispersed polyisocyanate either before or during the mixing of component ii) and provided that the equivalent ratio of amino groups from both components i) and ii) to isocyanate groups does not exceed 0.95:1.0.

6. The aqueous polyisocyanate dispersion of claim 5 wherein said primary or secondary monoamine corresponds to the formula

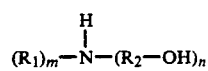

wherein $R_1$ represents hydrogen or an alkyl, cycloalkyl, araliphatic or aromatic group having up to 15 carbon atoms, $R_2$ is an optionally branched alkylene group containing 1 to 12 carbon atoms, m represents 0 or 1, n represents 1 or 2 and m+n=2.

7. The aqueous polyisocyanate dispersion of claim 6 wherein $R_1$ is an alkyl group containing 1 to 6 carbon atoms and $R_2$ is an optionally branched alkylene group containing 1 to 4 carbon atoms.

8. A process for the preparation of a fibrous mat which comprises
   a) dispersing in water a polyisocyanate which has an isocyanate content of at least 12% by weight,
   b) reacting the dispersed polyisocyanate with i) a primary or secondary monoamine containing at least one hydroxyl group in an amount sufficient to provide an equivalent ratio of amino groups to isocyanate groups of 0.1:1.0 to 0.7:1.0 and ii) a polyamine having primary and/or secondary amino groups and a molecular weight of 400 or less in an amount sufficient to provide an equivalent ratio of amino groups to isocyanate groups of 0.1:1.0 to 0.4:1.0, wherein component i) is mixed with the dispersed polyisocyanate either before or during the mixing of component ii) and provided that the equivalent ratio of amino groups from both components i) and ii) to isocyanate groups does not exceed 0.95:1.0 and c) subsequently treating fibers with said dispersed polyisocyanate before the isocyanate content of said dispersed polyisocyanate is less than 0.5% by weight, based on the weight of the polyisocyanate.

9. The process of claim 8 wherein said dispersed polyisocyanate is present in an amount of 1 to 20% by weight of polyisocyanate solids, based on the weight of the fibers.

10. The process of claim 8 wherein said dispersed polyisocyanate is rendered hydrophilic by reaction with a compound containing a lateral or terminal nonionic hydrophilic group.

11. The process of claim 8 wherein said primary or secondary monoamine corresponds to the formula $$(R_1)_m-\underset{|}{\overset{H}{N}}-(R_2-OH)_n$$

wherein
R$_1$ represents hydrogen or an alkyl, cycloalkyl, araliphatic or aromatic group having up to 15 carbon atoms,
R$_2$ is an optionally branched alkylene group containing 1 to 12 carbon atoms,
m represents 0 or 1,
n represents 1 or 2 and
m+n=2.

12. The process of claim 11 wherein
R$_1$ is an alkyl group containing 1 to 6 carbon atoms and
R$_2$ is an optionally branched alkylene group containing 1 to 4 carbon atoms.

13. The process of claim 8 wherein said fibers comprise fiberglass.

14. A process for the preparation of a fiberglass mat which comprises
a) dispersing in water an aromatic polyisocyanate which has a functionality of at least 2 and an isocyanate content of at least 12% by weight and is rendered hydrophilic by reaction with a compound containing a lateral or terminal nonionic hydrophilic group,
b) reacting the dispersed polyisocyanate with
i) a primary or secondary monoamine containing at least one hydroxyl group in an amount sufficient to provide an equivalent ratio of amino groups to isocyanate groups of 0.1:1.0 to 0.7:1.0 and
ii) a polyamine having primary and/or secondary amino groups and a molecular weight of 400 or less in an amount sufficient to provide an equivalent ratio of amino groups to isocyanate groups of 0.1:1.0 to 0.4:1.0, wherein component i) is mixed with the dispersed polyisocyanate either before or during the mixing of component ii) and provided that the equivalent ratio of amino groups from both components i) and ii) to isocyanate groups does not exceed 0.95:1.0 and c) subsequently treating fiberglass with said dispersed polyisocyanate in an amount of 1 to 20% by weight of polyisocyanate solids, based on the weight of fiberglass, before the isocyanate content of said dispersed polyisocyanate is less than 0.5% by weight, based on the weight of the polyisocyanate.

15. The process of claim 14 wherein said primary or secondary monoamine corresponds to the formula $$(R_1)_m-\underset{|}{\overset{H}{N}}-(R_2-OH)_n$$

wherein
R$_1$ represents hydrogen or an alkyl, cycloalkyl, araliphatic or aromatic group having up to 15 carbon atoms,
R$_2$ is an optionally branched alkylene group containing 1 to 12 carbon atoms,
m represents 0 or 1,
n represents 1 or 2 and
m+n=2.

16. The process of claim 15 wherein
R$_1$ is an alkyl group containing 1 to 6 carbon atoms and
R$_2$ is an optionally branched alkylene group containing 1 to 4 carbon atoms.

17. A fibrous mat which is prepared by a process which comprises
a) dispersing in water a polyisocyanate which has an isocyanate content of at least 12% by weight,
b) reacting the dispersed polyisocyanate with
i) a primary or secondary monoamine containing at least one hydroxyl group in an amount sufficient to provide an equivalent ratio of amino groups to isocyanate groups of 0.1:1.0 to 0.7:1.0 and
ii) a polyamine having primary and/or secondary amino groups and a molecular weight of 400 or less in an amount sufficient to provide an equivalent ratio of amino groups to isocyanate groups of 0.1:1.0 to 0.4:1.0, wherein component i) is mixed with the dispersed polyisocyanate either before or during the mixing of component ii) and provided that the equivalent ratio of amino groups from both components i) and ii) to isocyanate groups does not exceed 0.95:1.0 and c) subsequently treating fibers with said dispersed polyisocyanate before the isocyanate content of said dispersed polyisocyanate is less than 0.5% by weight, based on the weight of the polyisocyanate.

18. The fibrous mat of claim 17 wherein said dispersed polyisocyanate is present in an amount of 1 to 20% by weight of polyisocyanate solids, based on the weight of the fibers.

19. The fibrous mat of claim 17 wherein said dispersed polyisocyanate is rendered hydrophilic by reaction with a compound containing a lateral or terminal nonionic hydrophilic group.

20. The fibrous mat of claim 17 wherein said primary or secondary monoamine corresponds to the formula

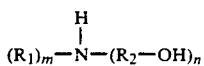

wherein
- $R_1$ represents hydrogen or an alkyl, cycloalkyl, araliphatic or aromatic group having up to 15 carbon atoms,
- $R_2$ is an optionally branched alkylene group containing 1 to 12 carbon atoms,
- m represents 0 or 1,
- n represents 1 or 2 and
- $m+n=2$.

21. The fibrous mat of claim 20 wherein
$R_1$ is an alkyl group containing 1 to 6 carbon atoms and
$R_2$ is an optionally branched alkylene group containing 1 to 4 carbon atoms.

22. The fibrous mat of claims 20 wherein said fibers comprise fiberglass.

23. A fiberglass mat which is prepared by a process which comprises
   a) dispersing in water an aromatic polyisocyanate which has a functionality of at least 2 and an isocyanate content of at least 12% by weight and is rendered hydrophilic by reaction with a compound containing a lateral or terminal nonionic hydrophilic group,
   b) reacting the dispersed polyisocyanate with
      i) a primary or secondary monoamine containing at least one hydroxyl group in an amount sufficient to provide an equivalent ratio of amino groups to isocyanate groups of 0.1:1.0 to 0.7:1.0 and
      ii) a polyamine having primary and/or secondary amino groups and a molecular weight of 400 or less in an amount sufficient to provide an equivalent ratio of amino groups to isocyanate groups of 0.1:1.0 to 0.4:1.0,
   wherein component i) is mixed with the dispersed polyisocyanate either before or during the mixing of component ii) and provided that the equivalent ratio of amino groups from both components i) and ii) to isocyanate groups does not exceed 0.95:1.0 and
   c) subsequently treating fiberglass with said dispersed polyisocyanate in an amount of 1 to 20% by weight of polyisocyanate solids, based on the weight of fiberglass, before the isocyanate content of said dispersed polyisocyanate is less than 0.5% by weight, based on the weight of the polyisocyanate.

24. The fiberglass mat of claim 23 wherein said primary or secondary monoamine corresponds to the formula

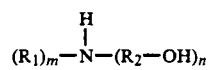

wherein
- $R_1$ represents hydrogen or an alkyl, cycloalkyl, araliphatic or aromatic group having up to 15 carbon atoms,
- $R_2$ is an optionally branched alkylene group containing 1 to 12 carbon atoms,
- m represents 0 or 1,
- n represents 1 or 2 and
- $m+n=2$.

25. The fiberglass mat of claim 24 wherein
$R_1$ is an alkyl group containing 1 to 6 carbon atoms and
$R_2$ is an optionally branched alkylene group containing 1 to 4 carbon atoms.

* * * * *